United States Patent [19]

Hradcovsky et al.

[11] 4,143,216
[45] Mar. 6, 1979

[54] LEAD CRYSTAL STORAGE CELLS AND STORAGE DEVICES MADE THEREFROM

[75] Inventors: Rudolf R. Hradcovsky; Otto R. Kozak, both of Long Beach, N.Y.

[73] Assignee: Solargen Electronics, Ltd., New York, N.Y.

[21] Appl. No.: 887,359

[22] Filed: Mar. 16, 1978

Related U.S. Application Data

[63] Continuation-in-part of Ser. No. 781,762, Mar. 28, 1977, abandoned, which is a continuation-in-part of Ser. No. 768,909, Feb. 15, 1977, abandoned.

[51] Int. Cl.$^2$ .............................................. H01M 6/04
[52] U.S. Cl. .................................. 429/204; 429/208; 423/581; 423/592
[58] Field of Search ............... 429/228, 204; 204/2.1, 204/83, 96; 423/581, 592, 618–621, 579

[56] References Cited

U.S. PATENT DOCUMENTS

| | | | |
|---|---|---|---|
| 3,928,066 | 12/1975 | Lewenstein | 429/228 X |
| 3,929,505 | 12/1975 | Burkett et al. | 204/2.1 |
| 4,008,144 | 2/1977 | Torikai | 429/228 X |

Primary Examiner—Charles F. LeFevour

[57] ABSTRACT

A unique storge cell is provided in which the active mass on the positive electrode is a mixture of crystalline and an effective amount of polycrystalline lead superoxide (PbO$_2$). These cells are characterized, inter alia, by their remarkably lower internal resistance, higher activity, better charging and discharging characteristics, lower sulphatization, higher storage capacity and greater ability to draw larger amounts of electric current in a considerably shorter period of time as compared with conventional lead-acid storage cells. Storage devices (e.g., a battery) made from such cells also exhibit superior performance characterstics as compared with storage devices made from the conventional lead-acid cells. Batteries made from such cells will be referred to as "lead-crystal" batteries.

Also, several methods are described for making the polycrystalline and crystalline lead superoxide (active mass).

22 Claims, 6 Drawing Figures

LEAD CRYSTAL STORAGE CELLS AND STORAGE DEVICES MADE THEREFROM

BACKGROUND OF THE INVENTION

1. Related Applications

This application is a continuation-in-part of application Ser. No. 781,762 filed Mar. 28, 1977, now abandoned, which is in turn a continuation-in-part of application Ser. No. 768,909 filed Feb. 15, 1977, now abandoned.

2. Field of Invention

This invention relates generally to improved storage cells and to devices, including storage batteries, which incorporate such cells in their construction. More specifically, the present invention is concerned with the active mass used in making the electrodes of such cells, wherein said active mass is a mixture of crystalline and polycrystalline lead superoxide, and to the methods of making the active mass.

3. The Prior Art

The construction and operation of a cell is generally well known. A cell, whether primary or secondary, is an electrochemical device which consists of two plates of conducting material immersed in an electrolyte. A primary cell is designed to develop an electric potential and to convert chemical energy into electrical energy irreversibly. A secondary cell, however, is reversible in its function and can transform chemical energy into electrical energy, or vice versa. Secondary cells are more commonly called "storage cells".

When a storage cell is supplying electric energy, the cell is said to be "discharging" and chemical energy is being converted to electrical energy, and when the storage cell is supplied with electrical energy, the process is reversed and the cell is said to be "charging".

Two or more cells connected together, in series or in parallel, constitute a battery and a battery made from connecting several storage cells is known as a storage battery. There are two common types of storage batteries; the lead-acid type battery, or as it is simply called, the lead battery, and the nickelalkaline or Edison type battery, popularly called the alkaline battery. It is with the former type battery that the present invention is concerned.

The cells in the lead-acid battery consist of a positive plate of lead oxide and a negative plate of spongy lead which are immersed in a diluted solution of sulfuric acid (electrolyte). The active mass or material of each plate is that part which undergoes a chemical change when electricity flows through the battery. This active mass is supported by a frame or grid of pure lead or lead alloy, e.g., an alloy of lead and antimony, which serves the dual function of carrying the active mass and conducting the electric current. It is with a novel, unique and improved active mass that the present invention is more specifically concerned.

The charging and discharging cycles of a typical lead-acid type battery may be represented by the following reversible reaction:

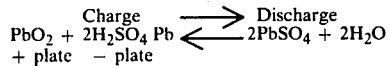

The active material of the positive plate is brown, porous lead oxide, while the active mass on the negative plate is gray, spongy and porous lead, in pure form.

The lead-acid batteries which are currently available in the marketplace exhibit limited performance capabilities, and numerous attempts and suggestions have heretofore been made to improve them. Thus, improvements in charging and discharging characteristics of these batteries, increasing their current discharge rate and reduction in the internal resistance of the battery cells are but a few of the numerous properties which have received considerable attention of the prior art workers in this field. Some have focused their attention on the electrodes while others have suggested a variety of electrolytes in order to improve the overall performance of the cells, and the devices which incorporate such cells.

Thus, U.S. Pat. No. 2,933,547 describes a battery made from a plurality of solid state electric cells consisting of silver and zinc electrodes and a solid, solvated cation-exchange resin membrane which is sandwiched between the electrodes.

U.S. Pat. No. 3,468,719 discloses a solid state ionic conductor made of a polycrystalline material in which the structural lattice is composed of ions of aluminum and oxygen in combination, and sodium ions which migrate in relation to the crystal lattice under the influence of an electric field. This material is employed as a half-cell separator in the construction of batteries as more fully described in example 3 of said patent.

U.S. Pat. No. 3,499,796 discloses a ceramic sandwich between a pair of electrochemically and cationically-conductive crystalline objects which are in cation exchange relationship and separated by a cationically-conductive, electronically non-conductive cyrstalline object, and to storage devices comprising the same.

U.S. Pat. No. 3,709,820 discloses an organic solid electrolyte which is a crystalline electron donor-acceptor complex comprising ionic crystals of 7,7,8,8-tetracyanoquinodimethane, an aromatic amine, and a liquid impregnated in the ionic crystal lattice. The electrolyte described in this patent is employed in capacitors to lower their resistivity.

U.S. Pat. No. 3,765,915 describes the uses of Beta-alumina polycrystalline ceramics for use as electrolyte in the construction of cells or batteries of the sodium/-sulfur type.

Since filing the aforementioned continuation-in-part application on Mar. 28, 1977, additional patents have come to applicants' attention. These patents are: U.S. No. 4,008,144 issued on Feb. 15, 1977 to Eiichi Torikai et al.; U.S. No. 3,928,066 issued on Dec. 23, 1975 to Hoshea L. Lewenstein; and U.S. No. 3,929,505 issued on Dec. 30, 1975 to Wilford B. Burkett et al.

Although the Torikai et al. patent discloses crystals of lead dioxide, it does not disclose the use of polycrystalline lead dioxide in accordance with our invention.

Neither the Lewenstein patent nor the Burkett et al. patent disclose crystalline lead dioxide, much less polycrystalline lead dioxide.

The foregoing patents are but a few of the plethora of patents which represent the research and activities which have been expended in this art. Nevertheless, however, the basic construction of the lead-acid battery and its constituent cells remain essentially unchanged. Today, as it was made several decades ago, lead-acid batteries are made by serial connection of a plurality of cells (usually 3 or 6) wherein porous lead oxide is the active mass on the positive plate and spongy, porous lead is the negative plate, and dilute sulfuric acid is the electrolyte of choice.

Accordingly, it is an object of the present invention to provide improved storage cells and devices which are made from such cells.

It is a further object of this invention to provide a storage battery in which the active mass on the positive electrode is a unique material made from crystalline and polycrystalline lead oxide. Such batteries will hereinafter be referred to as "lead-crystal" batteries to distinguish them from the conventional lead-acid batteries.

It is another object of this invention to provide novel and unique lead-crystal batteries which have superior performance characteristics as compared with the conventional lead batteries.

It is also an object of this invention to provide such lead-crystal batteries which exhibit lower internal resistance and higher potential difference (electromotive force) than the conventional lead batteries.

It is still another object of this invention to provide lead-crystal batteries which exhibit higher current charge and discharge capacity and which can be charged at a considerably faster rate than the conventional lead battery.

It is a further object of this invention to provide lead-crystal batteries which exhibit considerably lower sulphatization as compared with the lead-acid battery.

It is also an object of this invention to provide a method of making crystalline and polycrystalline lead oxide as the active mass.

It is yet another object of this invention to provide a unique positive plate for the construction of storage cells and batteries made from such cells.

It is also an object of this invention to provide such positive plates which comprise a carrier plate such as lead, an alloy of lead with antimony, or a non-conductive carrier material with a conductive coating, and lead oxide in crystalline and polycrystalline form applied to the surface of the carrier plate.

The foregoing and other objects of this invention will be more readily comprehended from the following detailed description of the invention taken in conjunction with the accompanying drawings which form a part of this application.

SUMMARY OF THE INVENTION

In accordance with this invention, a storage cell is provided in which the active mass on the positive electrode of the cell is a mixture of crystalline and polycrystalline lead superoxide ($PbO_2$). Thus, a mixture of lead and cadmium is first deposited, or otherwise conveniently applied, as a uniform, adherent layer, on a carrier plate made of lead, an alloy of lead with antimony, or a suitable inert and non-conductive material which is coated with lead or an alloy of lead with antimony. The lead-cadmium mixture may be deposited on the carrier plate by hot-spraying, so-called "powdered metallurgy" technique or by electroplating, all as hereinafter described in the ensuing detailed description of the invention.

The carrier plate which has been coated with lead and cadmium as aforesaid is then immersed in a container containing a dilute solution of sulfuric acid (electrolyte) and a lead plate or sheet which serves as the cathode. The carrier plate is then connected to the positive terminal of an emf source and the lead sheet is connected to the negative terminal of said source. The passage of electric current through the plates causes the oxidation of lead (in the lead-cadmium layer) to lead superoxide, in the form of crystalline and polycrystalline mass, while the cadmium reacts with sulfuric acid to form cadmium sulfate which is deposited on the lead sheet as a spongy material. The carrier plate is then removed from the solution, rinsed clean with water and dried.

Three carrier plates made as aforesaid are thereafter immersed in a second container containing a dilute solution of sulfuric acid. The middle carrier plate is connected to the positive terminal of an emf source while the other two carrier plates are jointly connected to the negative terminal of said emf source. Upon the passage of electric current, the middle carrier plate will be positively charged and the lead superoxide will remain unchanged while the lead oxide on the other two carrier plates is reduced to lead and becomes negatively charged.

After a few minutes, the emf source is removed and the emf within the cell drops from 2.9 volts to approximately 2.4 volts and remains essentially constant at this level. The cell is now charged and is storing energy for subsequent release.

Three or more such cells may be connected in series to form the lead-crystal battery of this invention.

DETAILED DESCRIPTION OF THE INVENTION

It has now been unexpectedly discovered that the performance of storage cells can be remarkably improved by providing the cells with a unique positive plate comprising crystalline and polycrystalline lead oxide in the form of $PbO_2$ as the active mass. Consequently, lead-crystal batteries made from such cells exhibit superior performance characteristics as compared with the conventional lead-acid batteries.

In the ensuing description, the present invention will be described in detail with particular reference to the construction of a storage cell, and a battery made from such cells. Such description, however, is not to be taken as limiting the scope of this invention as there are other storage devices which can be constructed on the basis of the principles set forth herein and which are, therefore, conprehended, contemplated and included within this disclosure.

It has been discovered that a storage cell constructed in accordance with this invention exhibits properties which have heretofore been unattainable in the prior art type storage cells, and consequently, devices, e.g., storage batteries, made by the serial connection of such cells, also exhibit superior performance characteristics as compared with the conventional lead batteries. Such improved properties include, although they are not limited to, lower internal resistance, higher activity, lower sulphatization, better charging and discharging characteristics, greater storage capacity, faster charging rates and higher emf per cell.

The unique active mass which is formed in accordance with the method of this invention is composed essentially of crystalline and polycrystalline lead oxide ($PbO_2$) in which lead has its maximum electron valence of four, and which is sometimes referred to as lead superoxide to distinguish it from PbO in which lead has its lower electron valence of two.

The term "polycrystalline" as used herein denotes an aggregation of incompletely grown single crystalline-like masses of lead superoxide, at varying stages of growth and development, wherein such masses do not have the characteristic tetragonal lattice structure of crystalline lead superoxide. Although such crystalline-like masses begin to form with a seed or nucleus similar to the seed or nucleus of fully grown and developed crystalline lead superoxide, it is believed that the electrochemical process in the presence of cadmium in accordance with our invention, interrupts the normal growth and development process and prevents such crystalline-like masses from reaching their fully grown and developed tetragonal crystal lattice structure. Unlike crystalline lead superoxide, such polycrystalline masses have no characteristic lattice structure. Thus, the active mass of this invention is a mixture of single crystalline masses of $PbO_2$ together with an effective amount of such single polycrystalline masses of $PbO_2$.

Figure 4:
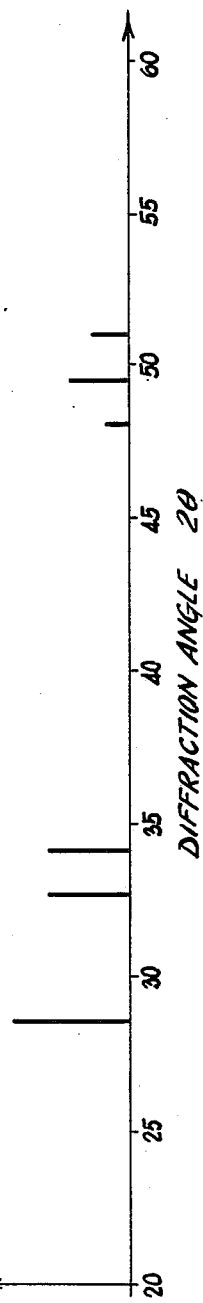
FIG. 4 is a bar graph representing the X-ray diffraction pattern for a standard reference $PbO_2$ card no. 11-549 of the International Centre for Diffraction Data, Swarthmore, Pa.
Figure 5A:
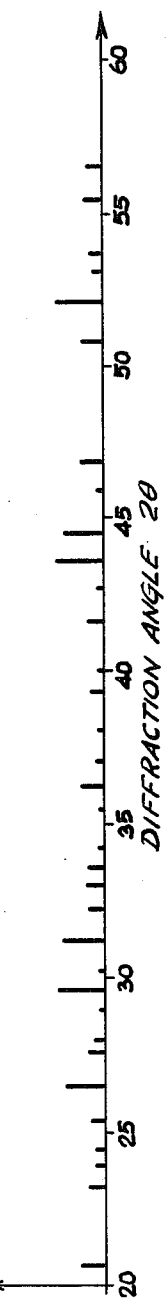
FIGS. 5A and 5B are bar graphs representing the X-ray diffraction patterns for two polycrystalline $PbO_2$ samples made according to the present invention.
Figure 5B:
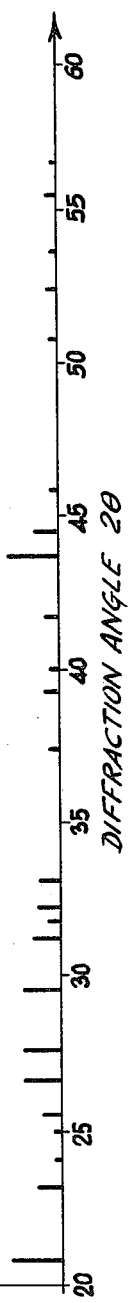

The polycrystalline component of the active mass is characterized by absence of the tetragonal lattice structure which is present in standard crystalline lead superoxide. As shown in FIGS. 5A and 5B, the X-ray diffraction patterns of two samples of polycrystalline lead superoxide made in accordance with this invention do not show the presence of peaks which are characteristic of standard lead superoxide crystals. Although the patterns of polycrystalline lead superoxide as shown in FIGS. 5A and 5B show marked similarities as well as some differences from each other, they are substantially different from published data for $PbO_2$ as shown in FIG. 4.

Figure 1:
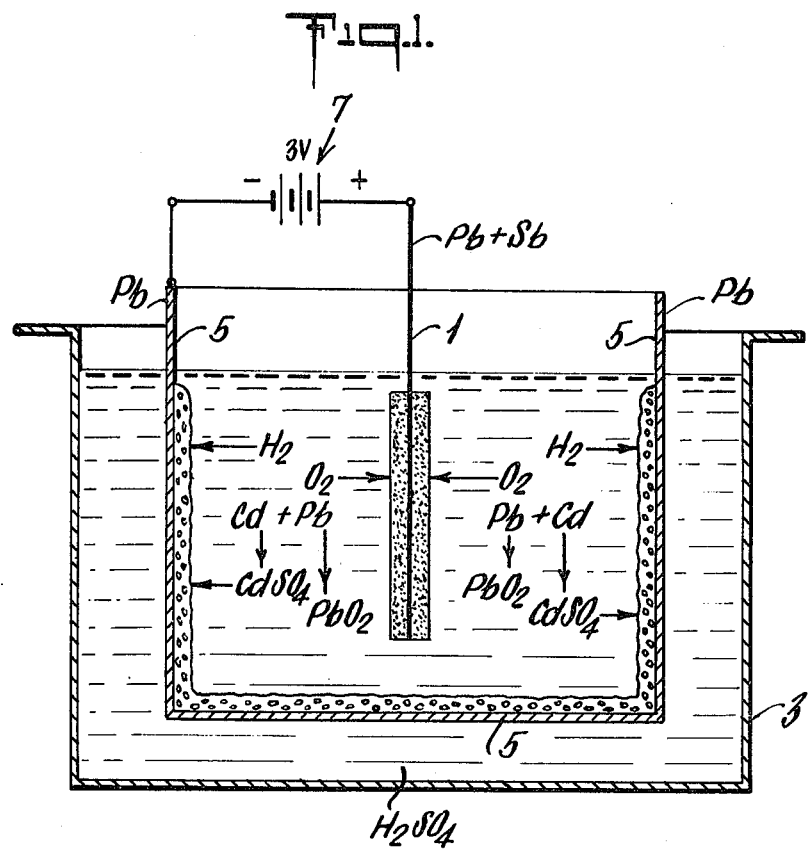
FIG. 1 is a schematic representation illustrating the method of formation of the active mass, i.e., the crystalline and polycrystalline lead oxide, in accordance with this invention.

In accordance with one embodiment of this invention, and with particular reference first to FIG. 1, a carrier plate 1 which is typically made of pure lead (Pb) or an alloy of lead with antimony (Pb-Sb), coated with a layer of Pb-Cd as hereinafter described, is immersed in a dilute solution of sulfuric acid (electrolyte) in a container 3. The carrier plate used herein is conveniently a foil of approximately 0.2mm thickness and is made of an alloy of lead and antimony. The thickness of the carrier plate, however, may vary somewhat depending on the particular construction and intended use of the storage device.

Prior to immersing the carrier plate 1 in the sulfuric acid solution, a hot melt of lead and cadmium is sprayed on the surface of the foil by means of a conventional spray gun, or some other suitable spraying device, to deposit a uniform and adherent layer of lead and cadmium on both surfaces of the foil. A reducing gas such as, for example, hydrogen is used in conjunction with the spraying of the hot melt on the foil's surface, and spraying is discontinued when the thickness of the deposited layer reaches approximately 0.5mm on each surface. Again, this thickness may vary somewhat depending on the particular construction, the required resistivity and the intended use of the device. Generally, the thickness of Pb-Cd layer on each surface may vary from about 0.1 to 2mm, preferably from about 0.5 to about 1.2mm and is most preferably about 1mm.

The Pb-Cd melt is prepared by coating a cadmium wire of approximately 1mm thickness electrolytically or by plating to obtain an approximately 1:1 ratio by weight of lead to cadmium, and the resulting wire is then melted, sprayed onto the surface of the foil as hereinbefore described at a temperature which is higher than the melting points of lead and cadmium, but lower than the temperature which will cause significant melting of the particular alloy of lead and antimony from which the carrier plate is made, thus causing sinterization of the Pb-Cd on the surface of the carrier plate.

In order to improve the adhesion of the Pb-Cd layer to the surface of the carrier plate 1, the carrier plate (foil) may first be sandblasted for several minutes to create a roughened surface so that the sinterized Pb-Cd mixture will be better bonded to the foil's surface. It must be understood that the terms "foil", "carrier plate" and "collector plate" are used interchangeably throughout this application to refer to the Pb-Sb carrier plate.

Referring again to FIG. 1, there is shown the container 3 made from a non-conductive material (e.g., glass, plastic, etc.) and containing a dilute solution of sulfuric acid (electrolyte) having approximately the same specific gravity as the sulfuric acid solutions employed in ordinary lead-acid type storage batteries. The container 3 is also provided with a lead plate or lead sheet 5 which serves as the negative electrode (cathode). The collector or carrier plate 1 which has been made as aforesaid is immersed in the electrolyte as shown in FIG. 1 and is connected to the positive terminal of a 3 volt emf source 7 (e.g., a battery) while the lead sheet 5 is connected to the negative terminal of said 3 volt emf source. Although more than one carrier plate may be immersed in the electrolyte and suitably connected to the emf source, the invention will be described and illustrated with reference to the preparation of one positive plate only for the sake of simplicity of illustration.

When the circuit is closed as hereinbefore described, the cadmium from the Pb-Cd layer on the carrier plate will react with sulfuric acid to form cadmium sulfate which is deposited as a porous, spongy mass on the lead sheet 5. Water is dissociated into hydrogen ($H_2$) and oxygen ($O_2$). Hydrogen appears as gas bubbles on the surface on the negative electrode while oxygen combines with lead, rapidly and continuously, to form lead superoxide ($PbO_2$) in the form of crystalline and polycrystalline mass. The formation of the active mass is thus completed within minutes and the carrier plate is removed, rinsed clean and dried. It is now ready to be used in the construction of the lead-crystal battery or cell of this invention.

The lead superoxide crystalline and polycrystalline active mass is a dark brown to black material. It is hard, homogenous, highly porous and has remarkably low internal resistance.

In preparing a carrier plate having crystalline and polycrystalline lead superoxide as the active mass, it is critical to the formation of such mass that the Pb-Sb plate be coated with Pb-Cd that is sintered. Thus, care must be taken to avoid the formation of Pb-Cd alloy during sinterization or hot spraying on the carrier plate in this embodiment of the invention. The presence of Cd in the sinterized mass is also critical since it aids or promotes the formation of $PbO_2$ crystals and polycrystals. Additionally, it must be noted that even though cadmium reacts with the sulfuric acid in container 3 to form cadmium sulfate and it is removed from this container, trace amounts of cadmium nevertheless remain in the active mass.

Figure 2:
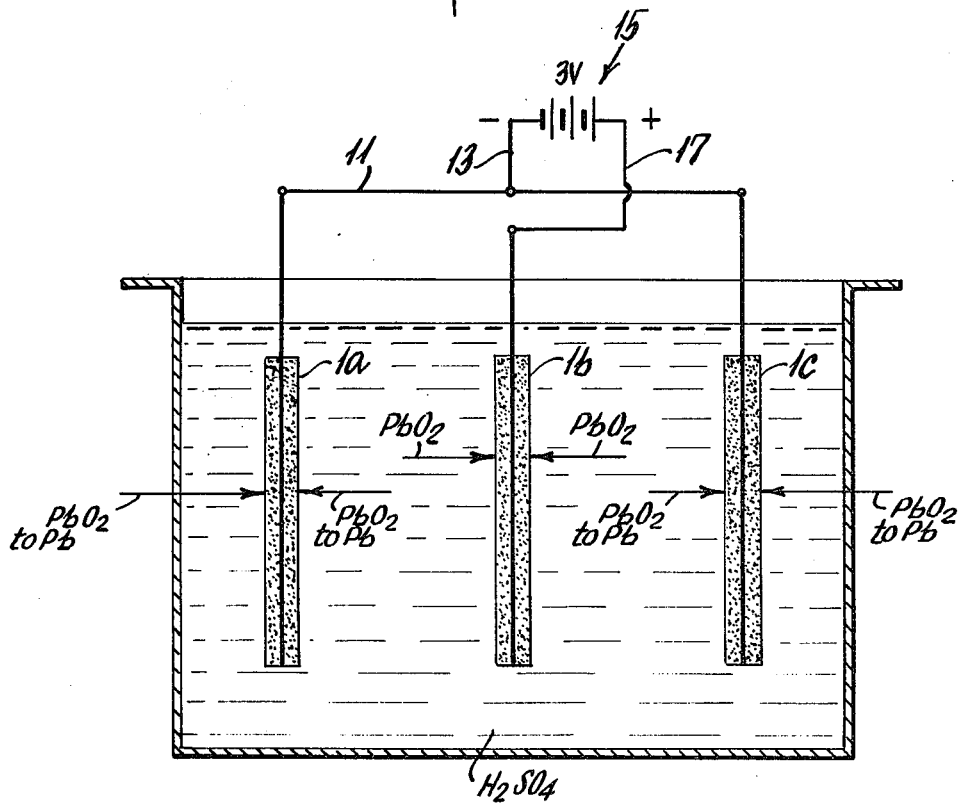
FIG. 2 is another schematic diagram illustrating the formation of the positive and negative plates and the cell comprising such plates.

In order to construct a lead crystal cell in accordance with this invention, three identical carrier plates 1a, 1b, and 1c which have been made by the aforedescribed procedure are immersed in a container 9 as shown in FIG. 2. Container 9 is similar in structure to the cell of a lead-acid battery and contains a dilute solution of sulfuric acid which is conventionally employed in such batteries. Carrier plates 1a and 1c are joined together by conductor 11 and connected by conductor 13 to the negative terminal of a 3 volt emf source 15 (e.g., a battery, a battery charger, etc.) while carrier plate 1b is connected to the positive terminal of the emf source 15 via conductor 17. When the circuit is thus closed, the $PbO_2$ on the carrier plates 1a and 1c is reduced to Pb and the plates become negatively charged, whereas the $PbO_2$ on the carrier plate 1b remains chemically unchanged and will become positively charged. Thus, the lead plates will serve as the negative electrodes (cathode) and the lead superoxide plate will serve as the positive electrode (anode).

After a few minutes when the cell has been fully charged, the emf source 15 is removed and the emf within the cell thus drops from 2.9 volts to approximately 2.4 volts, and remains essentially constant at this level. The cell is now charged and is storing energy for later release.

When a cell made as hereinbefore described is connected in series with other cells (e.g., 3 cells in all), each containing several plates (usually 17 or 19) connected in parallel, a lead-crystal battery is formed which may contain 51 or 57 plates depending on the number of cells and the number of plates in each cell. It is obvious, however, that more than 3 cells (e.g., 6 cells, etc.) may be connected in series, if desired.

Lead crystal batteries incorporating the unique features of this invention exhibit superior performance characteristics as compared with lead-acid batteries. Thus, because of its lower internal resistance, a lead crystal battery comprising 51 or 57 plates can accept about 10 to about 15 times as much electric current as the lead-acid battery. Consequently, the lead-crystal battery can be charged at much faster rates than the lead-acid battery. Similarly, the discharge rate of the lead-crystal battery is considerably improved since it can supply electric current at a considerably more accelerated rate than the lead-acid battery.

Figure 3:
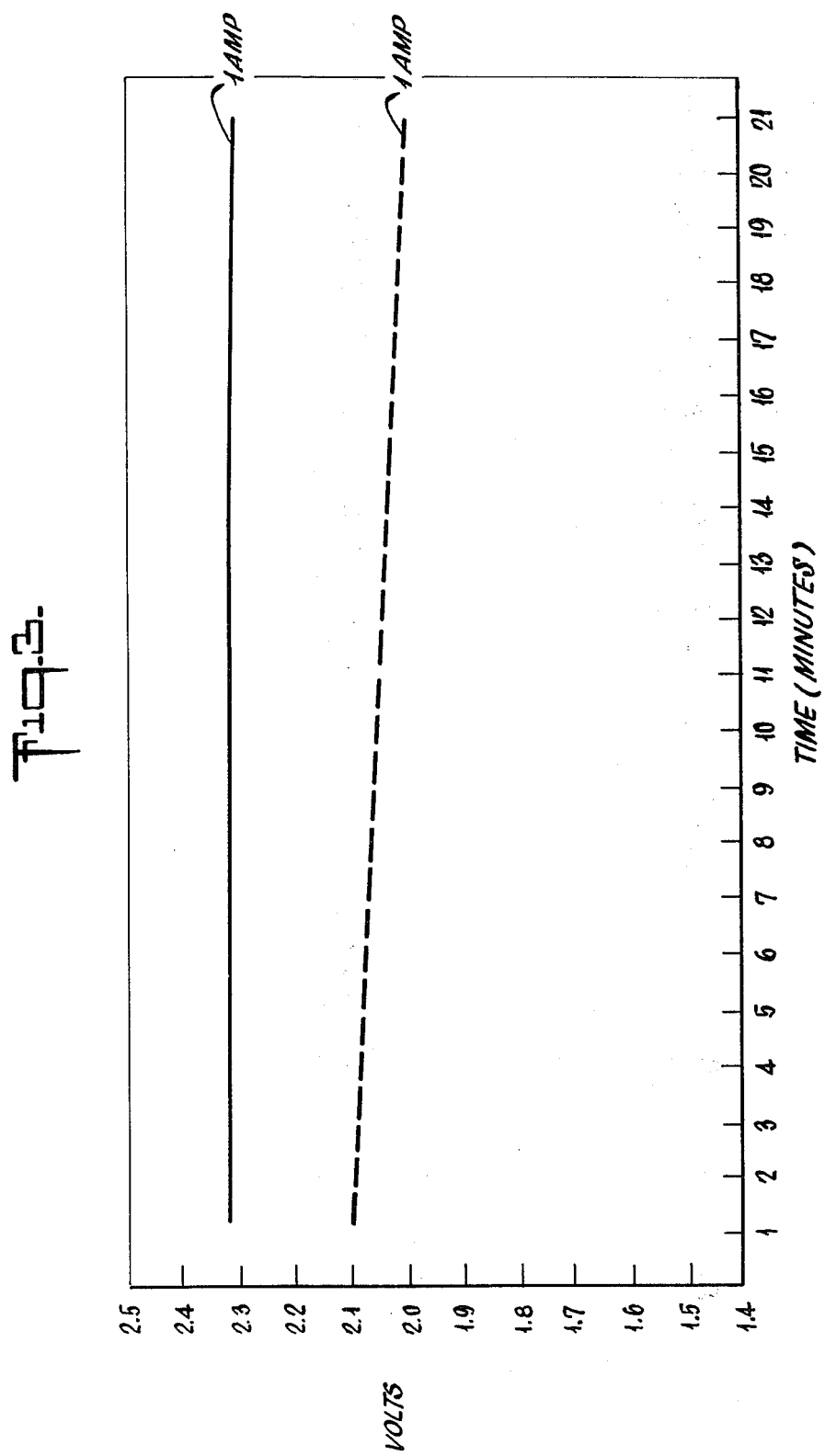
FIG. 3 shows two curves which compare the discharge characteristics of a lead-crystal cell made in accordance with this invention with a conventional lead-acid type cell.

The discharge curve of a lead-crystal cell made in accordance with this invention is compared in FIG. 3 with the discharge curve for a typical lead-acid cell. The solid curve in this figure represents the discharge curve for the lead-crystal cell and the dotted curve represents the discharge curve for the lead-acid cell. A comparison of these two curves indicates that during the first 16 minutes (i.e., during approximately 90% of the discharge cycle), the emf of the lead-crystal cell remains constant, then dropping very slightly from 2.32 to approximately 2.3 volts, whereas the emf of the lead-acid cell decreases steadily and constantly during the same period, dropping from 2.1 to approximately 2.0 volts. This difference is particularly significant in batteries made from such cells, and indicates that the lead-crystal battery can maintain a higher emf level than the lead-acid battery, and, therefore, exhibits superior performance characteristics.

Additionally, the lead-crystal batteries of this invention exhibit from about 25 to about 30 percent higher capacity than the conventional lead-acid batteries. Moreover, the lead-crystal cell is capable of a far more complete charge and discharge with no after-reaction or self-charge, as compared with a lead-acid cell; consequently, the lead-crystal battery exhibits far greater storage capacity than a lead-acid battery of comparable weight and volume. Cells made in accordance with the principles set forth herein are capable of developing from about 0.1 to about 0.2 volt higher emf than conventional storage cells from which the lead-acid batteries are made.

In the foregoing description, sinterized lead and cadmium was applied to the surface of the collector plates by hot spraying to deposit a homogenous, uniform and adherent layer of Pb-Cd thereon. Two additional methods will now be described for depositing such layer of Pb-Cd on the surface of the Pb-Sb carrier plate.

In another embodiment of this invention, a soft, granular, 1:1 mixture of lead and cadmium, wherein the size of the granules is from about 100 to almost 500 microns, is dissolved in a suitable organic liquid such as, for example, methanol (or ethanol) to prepare a paste which is then deposited on the surface of the carrier plate by a suitable sieve. The methanol is thereafter evaporated; the plate is dried, and the Pb-Cd is sinterized in a press at a termperature of from about 300° C. to about 400° C. for approximately 3 seconds. Once again, the termperature and pressure during sinterization must be carefully controlled so as to prevent the formation of the Pb-Cd alloy.

The thickness of the Pb-Cd layer on the carrier plate may be controlled by the selection of the proper sieve and by depositing the appropriate amount of paste uniformly on the surface of the plate. Thus, a Pb-Cd layer of approximately 0.5mm thickness may be deposited on both sides of the carrier plates.

After depositing the desired coating thickness, the carrier plate is immersed in a container comprising a dilute solution of sulfuric acid and a lead plate as hereinbefore described in connection with FIG. 1 and crystalline and polycrystalline lead superoxide ($PbO_2$) is once again formed on the surface of the carrier plate in the same manner. The cadmium from the Pb-Cd layer reacts with sulfuric acid and is deposited in the form of $CdSO_4$ from which the cadmium can be recovered and reused, and the carrier plate or plates then used to construct a lead-crystal cell as heretofore described in connection with FIG. 2.

In another embodiment of the invention a hard, compact alloy of lead and cadmium was deposited on the carrier plate by electroplating in a fluoroborate bath. Thus, two electrodes, one made from an alloy of lead with antimony (cathode) and the other from a 1:1 alloy of lead and cadmium (anode) were immersed in a fluoroborate bath having the following composition:

| | |
|---|---|
| Lead Fluoroborate, Pb $(BF_4)_2$ | 119 oz. |
| Metallic Lead, Pb | 65 oz. |
| Fluoroboric Acid, $HBF_4$ | 1.0 oz. |

| | |
|---|---|
| -continued | |
| Boric Acid | 8.0 oz. |
| Cadmium Fluoroborate, Cd (BF$_4$) | 32.5 oz. |
| Cadmium Metal, Cd | 12.0 oz. |
| Ammonium Fluoroborate | 8.0 oz. |
| Water | 1 gallon |

The electrodes were then connected to the positive and negative terminals of a 5 volt emf source for 1 hour until a uniform layer of cadmium and lead of approximately 0.1mm thickness was deposited on each surface of the cathode. The emf source was then disconnected, the cathode removed from the bath, rinsed clean with water and dried.

In order to produce three carrier plates with crystalline and polycrystalline lead superoxide on their surfaces, three cathodic carrier plates made by this procedure were immersed in a dilute sulfuric acid electrolyte and subjected to the same operation as hereinabove described in connection with FIG. 1. The resulting carrier plates were then used to construct a lead-crystal cell as hereinbefore described in connection with FIG. 2.

It is evident from the foregoing detailed description that the lead-crystal battery of this invention is remarkably superior to the lead-acid battery. In addition to the several unique features which were described supra, the lead-crystal battery is usually from about 15% to about 30% lighter in weight than a lead-acid battery of comparable size and capacity, and exhibits from about 25% to about 30% greater capacity as compared to a lead-acid battery of comparable size and wieght. The ability to draw substantially larger amounts of power in a considerably shorter period of time due to its significantly lower internal resistance and higher activity makes is particulary useful in vehicles which require fast acceleration, e.g., electric vehicles and cars, and other electrically motivated power sources.

Also, the lead-crystal batteries which are made in accordance with this invention exhibit little or no sulphatization. This means that, as a practical matter, these batteries can discharge to a point approaching zero emf. In contrast, sulphatization is a rather common phenomenon in the lead-acid batteries, and, consequently, the lead-acid batteries cannot discharge beyond about 1.5 to 1.8 volts emf, or almost irreversible sulphatization will take place in the lead grids which hold the paste of the active mass.

It must also be noted that while the invention has heretofore been described and illustrated with certain degrees of particularity, several changes and/or modifications may be made which are obvious from the foregoing description and which are, therefore, encompassed within the spirit and scope of this invention.

For example, instead of using Pb-Sb carrier plates, it is possible to use inert, non-conductive carrier plates (e.g., made from a suitable plastic such as polypropylene or cellulosic material) on which lead, or a mixture of lead with antimony, may be deposited as hereinbefore described. Such carrier plates are considerably lighter in weight than Pb-Sb carrier plates, and consequently, the resulting batteries will be considerably lighter as well.

Also, while the invention was heretofore illustrated with reference to a 1:1 ratio by weight of Pb:Cd, this ratio may vary from about 30 to about 70 weight percent and preferably from about 45 to about 55 weight percent; however, optimum results are obtained when an approximately equal weight ratio of the two components are used. If the mixture is predominantly lead, say, 70 weight percent, the Pb-Cd layer will be softer and less porous, whereas if the cadmium component predominates, say, it constitutes 70 weight percent of the mixture, the resulting Pb-Cd layer will be harder and more porous. Optimum hardness and porosity of the Pb-Cd layer are attained when the mixture is approximately a 1:1 ratio by weight.

What is claimed is:

1. A solid conductor for use in storage cells comprised of a carrier plate made from a material selected from the group consisting of lead, an alloy of lead with antimony and an inert, non-conductive substance coated with lead or an alloy of lead with antimony, and a uniform, adherent and durable layer of an active mass on said carrier plate, said active mass consisting essentially of crystalline and an effective amount of polycrystalline lead superoxide in which lead is at its maximum valence of four and wherein said polycrystalline lead superoxide is characterized by an X-ray diffraction pattern substantially as shown in FIGS. 5A or 5B.

2. A solid state conductor as in claim 1 wherein said carrier plate is lead.

3. A solid state conductor as in claim 1 wherein said carrier plate is an alloy of lead with antimony.

4. A solid state conductor as in claim 1 wherein said carrier plate is an inert, non-conductive material coated with lead or an alloy of lead with antimony.

5. A storage cell comprised of a dilute solution of sulfuric acid, at least one negative electrode and at least one positive electrode, each made from a material selected from the group consisting of lead, an alloy of lead with antimony and an inert, non-conductive substance coated with lead or an alloy of lead with antimony, wherein said positive electrode is coated with a uniform, adherent and durable layer of crystalline and an effective amount of polycrystalline lead superoxide in which lead is at its maximum valence of four, and wherein said polycrystalline lead superoxide is characterized by an X-ray diffraction pattern substantially as shown in FIGS. 5A or 5B.

6. A storage cell as in claim 5 wherein said electrodes are lead.

7. A storage device comprised of a plurality of serially connected storage cells as defined in claim 6.

8. A storage battery made by serially connecting a plurality of cells as defined in claim 6.

9. A storage cell as in claim 6 comprised of a plurality of positive electrodes connected in parallel and a plurality of negative electrodes connected in parallel.

10. A storage cell as in claim 5 wherein said electrodes are an alloy of lead with antimony.

11. A storage device comprised of a plurality of serially connected storage cells as defined in claim 10.

12. A storage battery made by serially connecting a plurality of cells as defined in claim 10.

13. A storage cell as in claim 10 comprised of a plurality of positive electrodes connected in parallel and a plurality of negative electrodes connected in parallel.

14. A storage cell as in claim 5 wherein said electrodes are an inert, non-conductive material coated with lead or an alloy of lead with antimony.

15. A storage device comprised of a plurality of serially connected storage cells as defined in claim 14.

16. A storage battery made by serially connecting a plurality of cells as defined in claim 14.

17. A storage cell as in claim 14 comprised of a plurality of positive electrodes connected in parallel and a plurality of negative electrodes connected in parallel.

18. A storage device comprised of a plurality of serially connected storage cells as defined in claim 5.

19. A storage battery made by serially connecting a plurality of cells as defined in claim 5.

20. A storage cell as in claim 5 comprised of a plurality of positive electrodes connected in parallel and a plurality of negative electrodes connected in parallel.

21. A composition of matter useful as the active mass of positive electrodes in storage cells, said composition consisting essentially of crystalline and an effective amount of polycrystalline lead superoxide in which lead is at its maximum valence of four, wherein said polycrystalline lead superoxide is characterized by an X-ray diffraction pattern substantially as shown in FIGS. 5A or 5B.

22. A composition of matter as in claim 21 further including trace amounts of metallic cadmium.

* * * * *